(12) United States Patent 
Nagaoka

(10) Patent No.: US 6,839,118 B2
(45) Date of Patent: Jan. 4, 2005

(54) SUBSTRATE FOR LCD HAVING PIXEL ELECTRODE ON COLOR FILTER LAYERS, LCD HAVING THE SAME, AND METHOD OF MANUFACTURING

(75) Inventor: Kenichi Nagaoka, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/347,159

(22) Filed: Jan. 17, 2003

(65) Prior Publication Data

US 2003/0137628 A1 Jul. 24, 2003

(30) Foreign Application Priority Data

Jan. 18, 2002 (JP) ........................................ 2002-010893

(51) Int. Cl.[7] ............................................ G02F 1/1343
(52) U.S. Cl. .......................... 349/143; 349/38; 349/39; 349/54; 349/55; 349/106; 349/141; 349/192
(58) Field of Search ............................. 349/38, 39, 54, 349/55, 106, 141, 143, 192

(56) References Cited

U.S. PATENT DOCUMENTS 5,926,234 A * 7/1999 Shiraki et al. ................. 349/40
6,118,505 A * 9/2000 Nagata et al. ............... 349/106
6,198,520 B1 * 3/2001 Kondo et al. ................ 349/141

FOREIGN PATENT DOCUMENTS

JP 4-307521 10/1992

* cited by examiner

*Primary Examiner*—Robert H. Kim
*Assistant Examiner*—Andrew Schechter
(74) *Attorney, Agent, or Firm*—Greer, Burns & Crain, Ltd

(57) ABSTRACT

The invention relates to a substrate for a liquid crystal display used as a display of an information apparatus, a liquid crystal display having the same, and a method of manufacturing the same and provides a substrate for a liquid crystal display on which the position of a defect can be easily detected to achieve high display quality, a liquid crystal display having the same, and a method of manufacturing the same. A configuration is employed which includes a glass substrate, gate bus lines and drain bus lines formed on the glass substrate such that they intersect each other through an insulating film, pixel regions provided in the form of a matrix on the substrate, a TFT formed at each of the pixel regions, a storage capacitor electrode formed at each of the pixel regions, a connection wiring which is formed of the same material as that of a source electrode of the TFT and the storage capacitor electrode and which electrically connects the source electrode and the storage capacitor electrode, CF resin layers formed at the pixel regions, and a pixel electrode formed at each of the pixel regions on the CF resin layers.

7 Claims, 19 Drawing Sheets

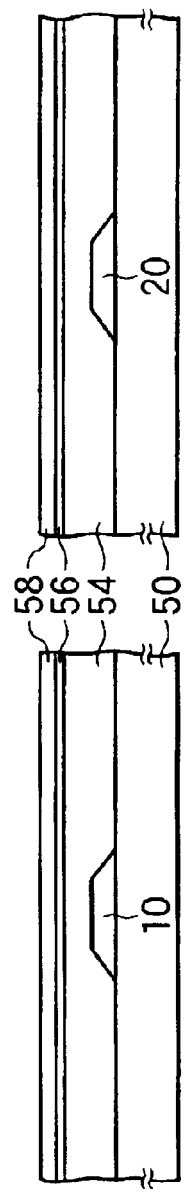

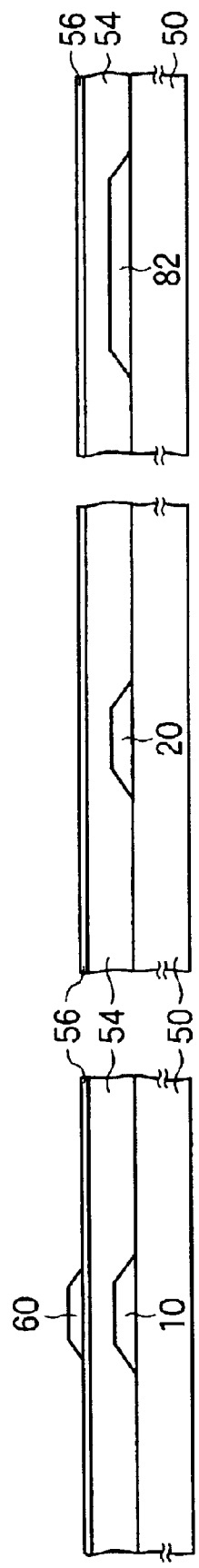

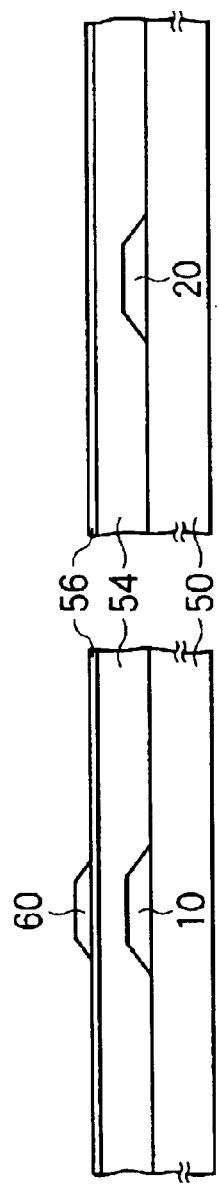

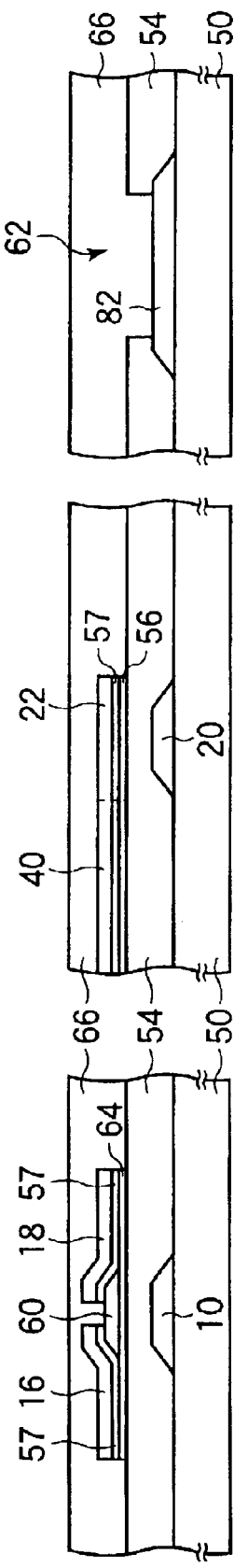

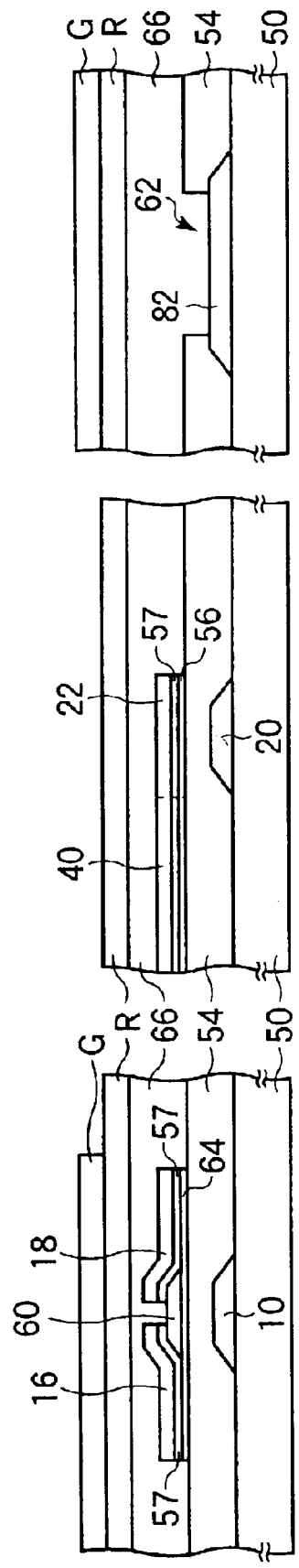

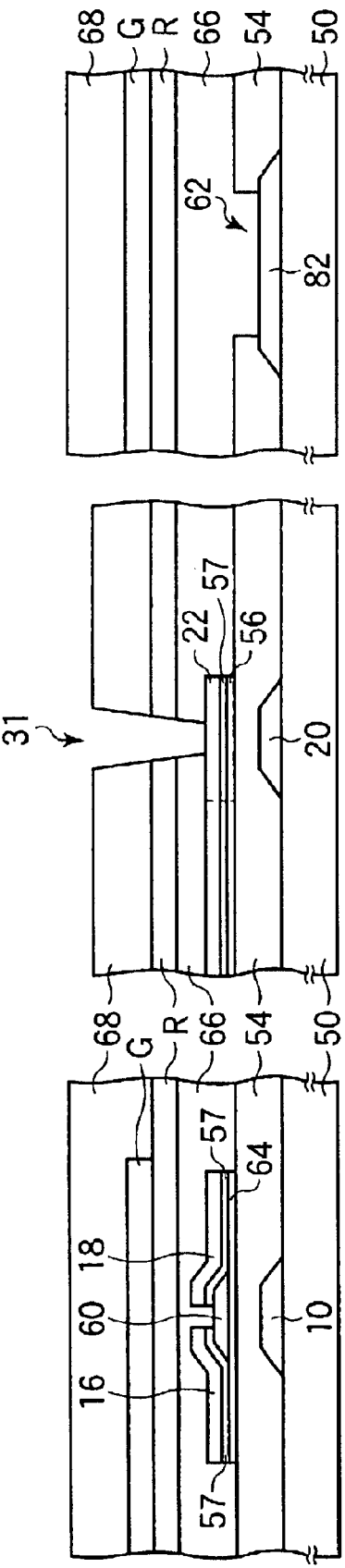

200
SUBSTRATE FOR LCD HAVING PIXEL ELECTRODE ON COLOR FILTER LAYERS, LCD HAVING THE SAME, AND METHOD OF MANUFACTURING

BACKGROUND OF THE INVENTION

1. Field of the Invention

The present invention relates to a substrate for a liquid crystal display used as a display of an information apparatus, a liquid crystal display having the same, and a method of manufacturing the same.

2. Description of the Related Art

As liquid crystal displays having finer pixels and an improved aperture ratio, attentions are being paid to liquid crystal displays having a CF-on-TFT (color filter on thin film transistor array) structure in which color filter resin layers are formed on a thin film transistor (TFT) substrate.

FIG. 17 shows a configuration of a liquid crystal display in the related art having the CF-on-TFT structure. As shown in FIG. 17, a plurality of gate bus lines 110 extending in the horizontal direction in the figure are formed in parallel with each other on a TFT substrate 102 (only one line is shown in FIG. 17). A plurality of drain bus lines 112 extending in the vertical direction in the figure are formed in parallel with each other such that they intersect the gate bus lines 110 with an insulation film which is not shown interposed therebetween. TFTs 114 are formed in the vicinity of the positions where the bus lines 110 and 112 intersect. Drain electrodes 116 of the TFTs 114 are electrically connected to the drain bus lines 112. Source electrodes 118 of the TFTs 114 are formed opposite to the drain electrodes 116.

A plurality of storage capacitor bus lines 120 are formed on the TFT substrate 102 in parallel with the gate bus lines 110 (only one line is shown in FIG. 17). Storage capacitor electrodes 122 are formed on the storage capacitor gate bus lines 120 with an insulation film which is not shown interposed therebetween. Storage capacitances are formed by the storage capacitor bus lines 120 and the storage capacitor electrodes 122.

A CF resin layer in any of red (R), green (G), and blue (B) is formed in each of pixel regions of the TFT substrate 102. Leveling resin films (overcoat layers) and pixel electrodes 132 are formed on the CF resin layers. The pixel electrodes 132 are electrically connected to the source electrodes 118 through contact holes 130 and are connected to the storage capacitor electrodes 122 through contact holes 131. That is, the source electrodes 118 are electrically connected to the storage capacitor electrodes 122 through the pixel electrodes 132.

A method of manufacturing the TFT substrate of a liquid crystal display according to the related art having the CF-on-TFT structure will now be described with reference to FIGS. 18 and 19. FIG. 18 is a flow chart showing steps for manufacturing the TFT substrate having the CF-on-TFT structure according to the related art. First, a metal layer is formed and patterned throughout a top surface of a glass substrate to form the gate bus lines (gate electrodes) 110 and the storage capacitor bus lines 120 (step S21). Next, an insulation film (gate insulation film) is formed on the entire surface (step S22). Next, a metal layer is formed and patterned on the entire surface of the gate insulation film to form the drain electrodes 116, the source electrodes 118, the drain bus lines 112, and the storage capacitor electrodes 122 (step S23).

FIG. 19 shows a configuration of the TFT substrate 102 at the point in time when the process at step S23 has been completed. As shown in FIG. 19, since the pixel electrodes 132 have not been formed yet at the point in time when the process at step S23 has been completed, the source electrodes 118 and the storage capacitor electrodes 122 are not electrically connected.

Referring to FIG. 18 again, a protective film is formed on the entire surface of the drain electrodes 116, source electrodes 118, drain bus lines 112, and storage capacitor bus lines 122 (step S24). Next, any of the CF resin layers R, G, and B is formed in each of the pixel regions on the protective film (step S25). Next, the overcoat layer is formed on the CF resin layers (step S26). Openings are then formed in the overcoat layer, the CF resin layers, and the protective film above the source electrodes 118 and the storage capacitor electrodes 122 to form the contact holes 130 and 131, respectively (step S27). Next, a pixel electrode 132 constituted of an ITO (indium tin oxide) is formed in each pixel region (step S28). At this time, the pixel electrodes 132 are electrically connected to the source electrodes 118 through the contact holes 130 and are electrically connected to the storage capacitor electrodes 122 through the contact holes 131. An array inspection (step S29) is then conducted.

At the array inspection, for example, a predetermined voltage is applied to the drain bus lines 112 to turn on the TFTs 114 and to thereby charge the storage capacitance at each pixel with a predetermined charge, and the charge stored at each pixel is measured to detect a defect by checking whether the charge is in the excess of a threshold or not. When a defect is detected at the array inspection, the process proceeds to step S30 where predetermined repair is performed using a laser on the defect, and the process then returns to step S29. When no defect is detected at the array inspection, the process proceeds to step S31 to conduct a visual inspection.

The array inspection is conducted after it becomes possible to charge the storage capacitance at each pixel with a charge. In the configuration of the TFT substrate 102 according to the related art, the source electrodes 118 and the storage capacitor electrodes 122 are electrically connected through the pixel electrodes 132 formed on the CF resin layers. Therefore, the array inspection is conducted on the TFT substrate 102 having the CF-on-TFT structure after the CF resin layers R, G, and B and the pixel electrodes 132 are formed.

The CF resin layers R, G, and B provide a light-blocking function when at least two such layers are formed in an overlapping relationship. Therefore, at least two of the CF resin layers, R, G, and B are formed on the TFTs 114 and a frame area around a display area.

FIG. 20 shows a configuration of a frame area of the TFT substrate 102 according to the CF-on-TFT-structure of related art. As shown in FIG. 20, a frame area 152 is provided around a display area 150 of the TFT substrate 102. At least two of the CF resin layers R, G, and B are stacked except in some regions to be described later.

FIG. 21 is an enlarged view of the region enclosed by a circle a shown in FIG. 20. Repair wirings 154, 155, and 158 for repairing breakage of the drain bus lines 112 are formed such that they avoid the display area 150 in the frame area 152 as shown FIG. 21. The repair wirings 154 intersect a plurality of drain bus lines 112 with an insulation film interposed therebetween at respective connecting portions 156. The repair wirings 155 intersect a plurality of drain bus lines 112 with the insulation film interposed therebetween at respective connecting portions 157. One end of the repair wirings 158 is formed on one end of the repair wirings 154 with the insulation film interposed therebetween at a connecting portion 160.

When a drain bus line 112 that has been broken is repaired, the connecting portion 156 of the drain bus line 112 is irradiated with a laser beam to electrically connect the drain bus line 112 and the repair wiring 154. Further, the connecting portion 160 is irradiated with a laser beam to electrically connect the repair wirings 154 and 158. The drain bus line 112 is repaired by bypassing a tone voltage using the repair wirings 154 and 158.

As shown in FIG. 21, only one of the CF resin layers R, G, and B is formed instead of two in the regions in the vicinity of the connecting portions 156, 157, and 160 that are irradiated by a laser beam. Since those regions are therefore not shaded, the connecting portions 156, 157, and 160 can be visually checked, which makes it easy to irradiate the connecting portions 156, 157, and 160 with a laser beam.

However, when such a configuration is employed, since the neighborhood of the connecting portions 156, 157, and 160 of the frame area 152 is not shaded, light leaks in the vicinity of the connecting portions 156, 157, and 160. Since the connecting portions 156, 157, and 160 are provided in the vicinity of the display area 150, the leakage of light from those portions results in the problem of a reduction of display quality.

At least two of the CF resin layers R, G, and B are stacked on the TFTs 114, the gate bus lines 110, and the drain bus lines 112 for the purpose of shading. This results in a problem in that it is difficult to detect the exact position of a defect at a visual inspection using a microscope even when the defect is electrically detected at an array inspection.

Although not shown, outside the display area 150 of the TFT substrate 102, there is formed an inner-short-ring for preventing electrostatic discharge damage that remains when the product is completed. Outside the inner-short-ring, there is formed an outer short ring for preventing electrostatic discharge damage that is cut off and discarded at a subsequent step. The two short-rings are connected through the bus lines 110, 112, and 116 and TFTs for preventing electrostatic discharge damage. This prevents any shift of a threshold of TFTs and inter-layer shorting that otherwise occurs when the bus lines 110, 112 and 116 are charged with static electricity.

A gate electrode and a drain electrode of a TFT for preventing electrostatic discharge damage are electrically connected to the same bus line 110, 112, or 116 or the same short-ring such that it is turned on when the respective bus line 110, 112, or 116 is charged with static electricity having a high potential. In the related art, the gate electrode and drain electrode of a TFT for preventing electrostatic discharge damage are electrically connected through a contact hole provided by forming an opening in a protective film and an insulation film on a gate metal layer electrically connected to the gate electrode, a contact hole provided by forming an opening in a protective film on a drain metal layer electrically connected to the drain electrode, and an ITO layer formed between those contact holes.

However, since one or two or all of the CF resin layers R, G, and B are formed under the ITO layer, an opening must be formed through the CF layers, R, G and B to form those contact holes. Therefore, the regions where the contact holes are formed are not shaded, which can cause light to leak from the frame area 152. This results in a problem that display quality is reduced by the leakage of light.

SUMMARY OF THE INVENTION

The invention provides a substrate for a liquid crystal display on which the position of a defect can be easily detected to provide high display quality, a liquid crystal display having the same, and a method of manufacturing the same.

The above-described problems are solved by a substrate for a liquid crystal display characterized in that it has a base substrate that sandwiches a liquid crystal in combination with an opposite substrate provided opposite thereto, a plurality of bus lines formed on the base substrate such that they intersect each other with an insulation film interposed therebetween, pixel regions provided in the form of a matrix on the base substrate, a thin film transistor formed at each of the pixel regions, a storage capacitor electrode formed at each of the pixel regions, and a connection wiring which is formed of the same material as that of a source electrode of the thin film transistor and the storage capacitor electrode and which electrically connects the source electrode and the storage capacitor electrode.

A substrate for a liquid crystal display according to the invention is characterized in that the connection wiring is formed in the pixel regions.

A substrate for a liquid crystal display according to the invention, is characterized in that it has color filter layers formed at the pixel regions and a pixel electrode formed at each of the pixel regions on the color filter layers.

A substrate for a liquid crystal display according to the invention is characterized in that the pixel electrode has a stripe-like electrode having a trunk section extending in parallel with or perpendicularly to the bus lines and a plurality of branch sections branching from the trunk section and extending at an angle to the bus lines and spaces in the stripe-like electrode and in that the connection wiring is formed in an overlapping relationship with the strike-like electrode when viewed in a direction perpendicular to the substrate surface.

A substrate for a liquid crystal display according to the invention is characterized in that the connection wiring is formed in an overlapping relationship with the trunk section when viewed in a direction perpendicular to the substrate surface.

A substrate for a liquid crystal display according to the invention is characterized in that it has repair wirings formed for repairing the bus lines and intersecting portions where the bus lines and the repair wirings intersect with an insulation film interposed therebetween and in that at least two of the color filter layers are formed by laminating each other on the intersecting portions.

A substrate for a liquid crystal display according to the invention is characterized in that it has a short-ring formed around the base substrate and a thin film transistor for preventing electrostatic discharge damage that connects the short-ring and the plurality of bus lines and in that a gate electrode and a drain electrode of the thin film transistor for preventing electrostatic discharge damage are electrically connected through a contact hole formed in a gate insulation film.

The above-described problems are solved by a liquid crystal display having a pair of substrates and a liquid crystal sealed between the pair of substrates, characterized in that a substrate for a liquid crystal display according to the invention is used as one of the substrates.

Further, the above-described problems are solved by a method of manufacturing a substrate for a liquid crystal display having the steps of forming a source electrode and a storage capacitor electrode of a thin film transistor and forming a connection wiring for electrically connecting the source electrode and the storage capacitor electrode simultaneously and performing an array inspection before forming color filter layers on the source electrode and the storage capacitor electrode.

The above-described problems are solved by a method of detecting a defect of a liquid crystal display in which an array inspection is performed on a thin film transistor substrate having color filter layers formed on a bus line layer to inspect a defect on a bus line, the method being characterized in that a visual inspection is performed on a defect using an infrared microscope that detects and visualizes the intensity of infrared rays after the defect is detected at the array inspection.

BRIEF DESCRIPTION OF THE DRAWINGS

FIGS. 8A to 8C are sectional views taken at a manufacturing step to show steps for manufacturing the substrate for a liquid crystal display according to the embodiment of the invention;

FIGS. 9A to 9C are sectional views taken at a manufacturing step to show steps for manufacturing the substrate for a liquid crystal display according to the embodiment of the invention;

FIGS. 10A to 10C are sectional views taken at a manufacturing step to show steps for manufacturing the substrate for a liquid crystal display according to the embodiment of the invention;

FIGS. 13A to 13C are sectional views taken at a manufacturing step to show steps for manufacturing the substrate for a liquid crystal display according to the embodiment of the invention;

FIGS. 14A to 14C are sectional views taken at a manufacturing step to show steps for manufacturing the substrate for a liquid crystal display according to the embodiment of the invention;

FIGS. 16A to 16C are sectional views taken at a manufacturing step to show steps for manufacturing the substrate for a liquid crystal display according to the embodiment of the invention;

DESCRIPTION OF THE PREFERRED EMBODIMENT

Figure 1:
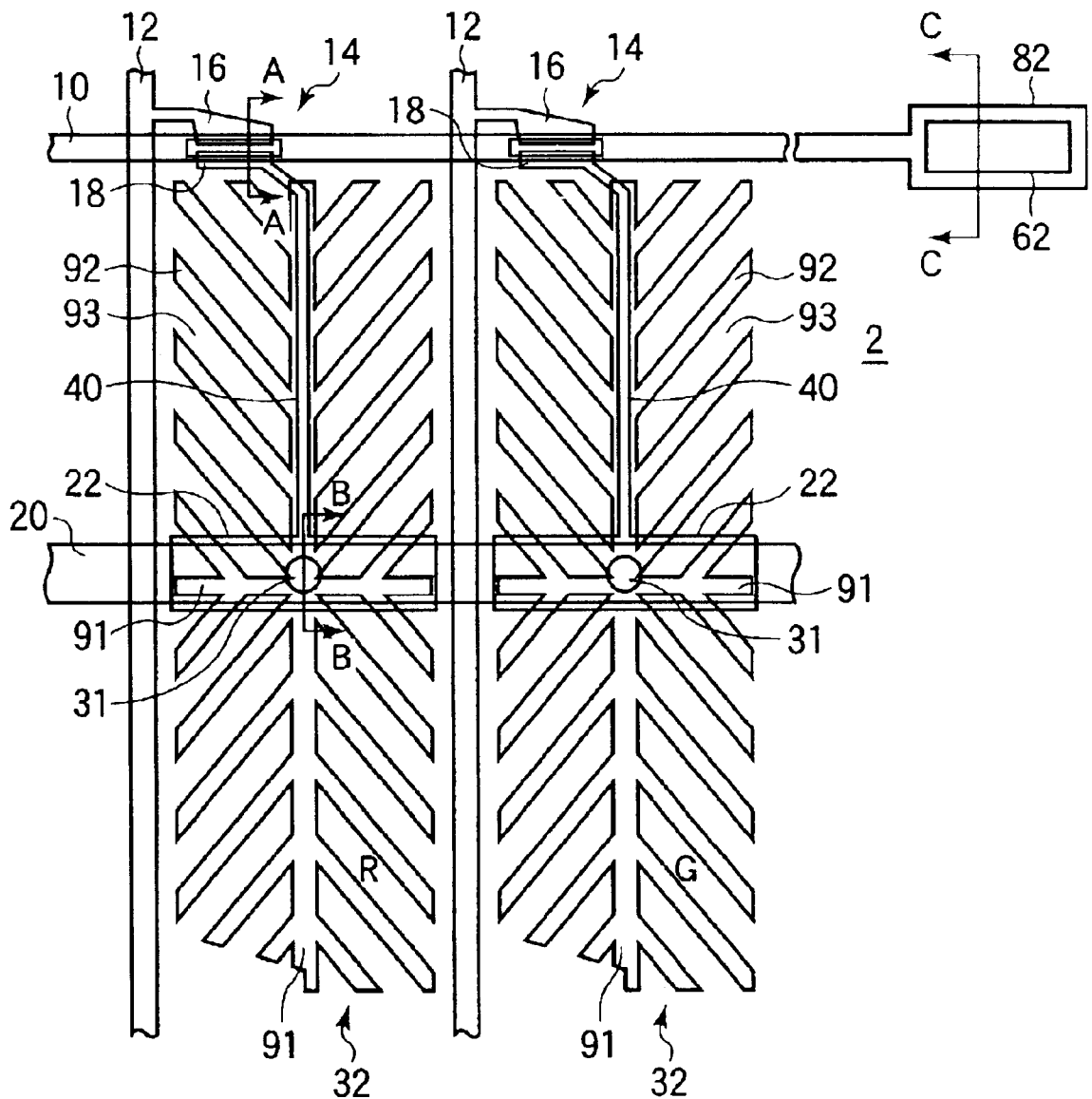
FIG. 1 shows a configuration of a substrate for a liquid crystal display according to an embodiment of the invention.

A description will now be made with reference to FIGS. 1 to 16C on a substrate for a liquid crystal display, a liquid crystal display having the same according to an embodiment of the invention and manufacturing method thereof. FIG. 1 shows a configuration of a substrate for a liquid crystal display of the present embodiment of the invention. As shown in FIG. 1, a plurality of gate bus lines 10 (FIG. 1 shows only one of them) extending in the horizontal direction in the figure are formed in parallel with each other on a TFT substrate (base substrate) 2. A plurality of drain bus lines 12 extending in the vertical direction in the figure are formed in parallel with each other such that they intersect the gate bus lines 10 with an insulation film that is not shown interposed therebetween. Although not shown in FIG. 1, gate bus line terminals 52 that are connected to a gat bus line driving circuit for driving the gate bus lines 10 are formed on the left side of the gate bus lines 10 in the figure as shown in FIG. 5 which will be described later. Further, not shown in FIG. 1, drain bus line terminals 80 that are connected to a drain bus line driving circuit for driving the drain bus lines 12 are formed above the drain bus lines 12 as shown in FIG. 5. As shown in FIG. 5, gate bus line inspection terminals 82 used at an array inspection are formed on the right side of the gate bus lines 10 in the figure, and drain bus line inspection terminals 86 similarly used at the array inspection are formed between the drain bus lines 12 in the figure.

TFTs 14 are formed in the vicinity of the positions where the bus lines 10 and 12 intersect in pixel regions. Drain electrodes 16 of the TFTs 14 are electrically connected to the drain bus lines 12. Source electrodes 18 of the TFTs 14 are formed opposite to the drain electrodes 16 with a predetermined gap left between them.

A storage capacitor bus line 20 is formed in each of the pixel regions of the TFT substrate 2 in parallel with the gate bus lines 10. Storage capacitor electrodes 22 are formed on the storage capacitor bus lines 20 with an insulation film which is not shown interposed therebetween. The storage capacitor bus lines 20 and the storage capacitor electrodes 22 form storage capacitances.

At least one of CF resin layers R, G, and B is formed in each of the pixel regions of the TFT substrate 2. Pixel electrodes 32 are formed on the CF resin layers R, G, and B. The pixel electrodes 32 are constituted of a stripe-like electrode having two trunk sections 91 extending in parallel with and perpendicularly to the drain bus lines 12 and a plurality of branch sections 92 branching from the trunk sections 91 and extending at an angle to the drain bus lines 12 and spaces 93 in the stripe-like electrode. The pixel electrodes 32 have a vein-like configuration that is formed by the stripe-like electrode and the spaces 93. This configuration allows liquid crystal molecules to be aligned during polymerization of a monomer material to carry out the polymer fixing method for regulating the alignment of liquid crystal molecules. When the polymer fixing method is not used, the pixel electrodes 32 may be directly used as alignment regulating means. The pixel electrodes 32 are electrically connected to the storage capacitor electrodes 22 through contact holes 31. In each pixel region, a connection wiring 40 for electrically connecting the source electrode 18 and the storage capacitor electrode 22 is formed. The connection wirings 40 are provided such that they overlap the trunk sections 91 of the pixel electrodes 32 when viewed in a direction perpendicular to the substrate surface.

Figures 2A, 2B, 2C:
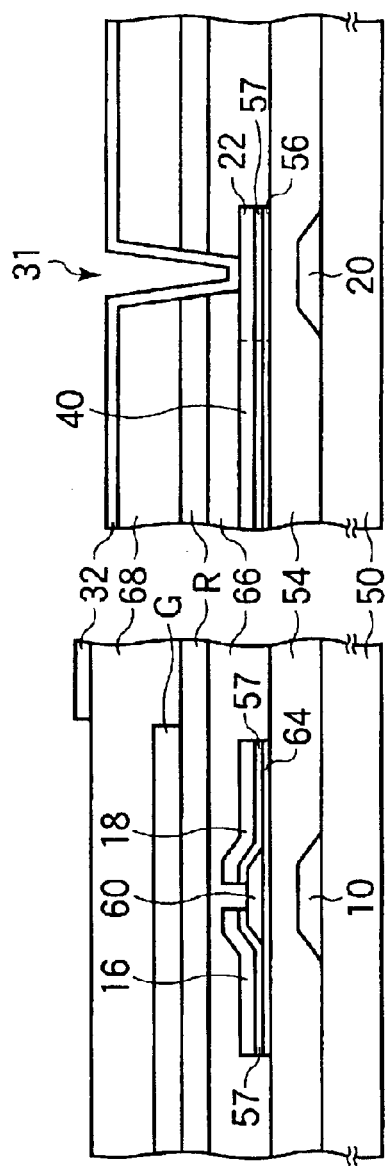
FIGS. 2A, 2B, and 2C are sectional views showing a configuration of the substrate for a liquid crystal display according to the embodiment of the invention.

FIGS. 2A, 2B, and 2C are sectional views showing a configuration of the substrate for a liquid crystal display of the present embodiment of the invention. FIG. 2A shows a section in the vicinity of a TFT 14 taken along the line A—A in FIG. 1. FIG. 2B shows a section in the vicinity of a storage capacitor taken along the line B—B in FIG. 1. FIG. 2C shows a section in the vicinity of a gate bus line inspection terminal 82 taken along the line C—C in FIG. 1.

As shown in FIG. 2A, a gate electrode 10 is formed on the glass substrate 50. An insulation film 54 is formed through the substrate surface and on the gate electrode 10. An active semiconductor layer 64 is formed on the insulation film 54. A channel protection film 60 is formed on the active semiconductor layer 64. On the active semiconductor layer 64 and the channel protection film 60, there is formed a drain electrode 16 and a source electrode 18 under each of which an n+a-Si layer 57 is formed. One end of the drain electrode 16 and one end of the source electrode 18 face each other on the channel protection film 60 with a predetermined gap left therebetween. A protective film 66 is formed throughout the substrate surface on the drain electrode 16 and the source electrode 18. For example, CF resin layers R and G are formed on the protective film 66 by laminating in this order. An overcoat layer 68 is formed on the CF resin layer G. A pixel electrode 32 is formed in a pixel region on the overcoat layer 68.

As shown in FIG. 2B, a storage capacitor bus line 20 is formed of the same material as that of the gate electrode 10 on the glass substrate 50. An insulation film 54 is formed throughout the substrate surface on the storage capacitor bus line 20. On the insulation film 54, there is formed a storage capacitor electrode 22 (on the right side of the broken line in the figure) and a connection wiring 40 (on the left side of the broken line in the figure) under which an a-Si layer 56 and an n+a-Si layer 57 are formed, respectively. The storage capacitor electrode 22 and the connection wiring 40 are formed of the same material as that of the drain electrode 16 and the source electrode 18. A protective film 66 is formed throughout the substrate surface on the storage capacitor electrode 22. For example, a CF resin layer R is formed on the protective film 66. An overcoat layer 68 is formed on the CF resin layer R. A pixel electrode 32 is formed on the overcoat layer 68. The pixel electrode 32 is electrically connected to the storage capacitor electrode 22 through a contact hole 31 that is formed by providing an opening through the overcoat layer 68, the CF resin layer R, and the protective film 66 on the storage capacitor electrode 22.

As shown in FIG. 2C, a gate bus line inspection terminal 82 is formed of the same material as that of the gate electrode 10 on the glass substrate 50. A contact hole 62 is formed above the gate bus line inspection terminal 82 by providing an opening through the insulation film 54 formed throughout the substrate surface. On the insulation film 54, the protective film 66, the CF resin layers R and G, and the overcoat layer 68 are formed by laminating in this order.

Figure 3:
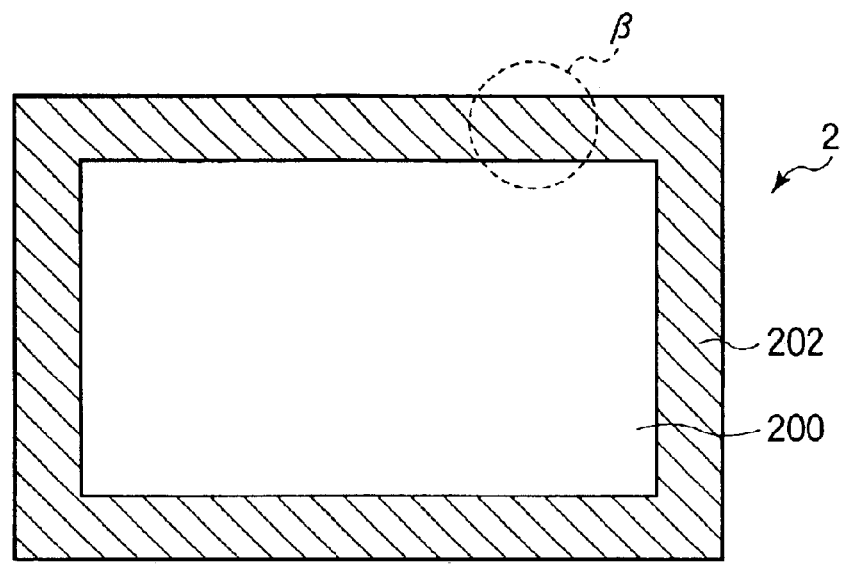
FIG. 3 shows a configuration of the substrate for a liquid crystal display according to the embodiment of the invention.

FIG. 3 shows a configuration around a display area of the substrate for a liquid crystal display of the present embodiment of the invention. As shown in FIG. 3, a frame area 202 is provided around a display area 200 of the TFT substrate 2. The frame area 202 is shaded by at least two of the CF resin layers R, G, and B which are stacked in this order.

Figure 4:
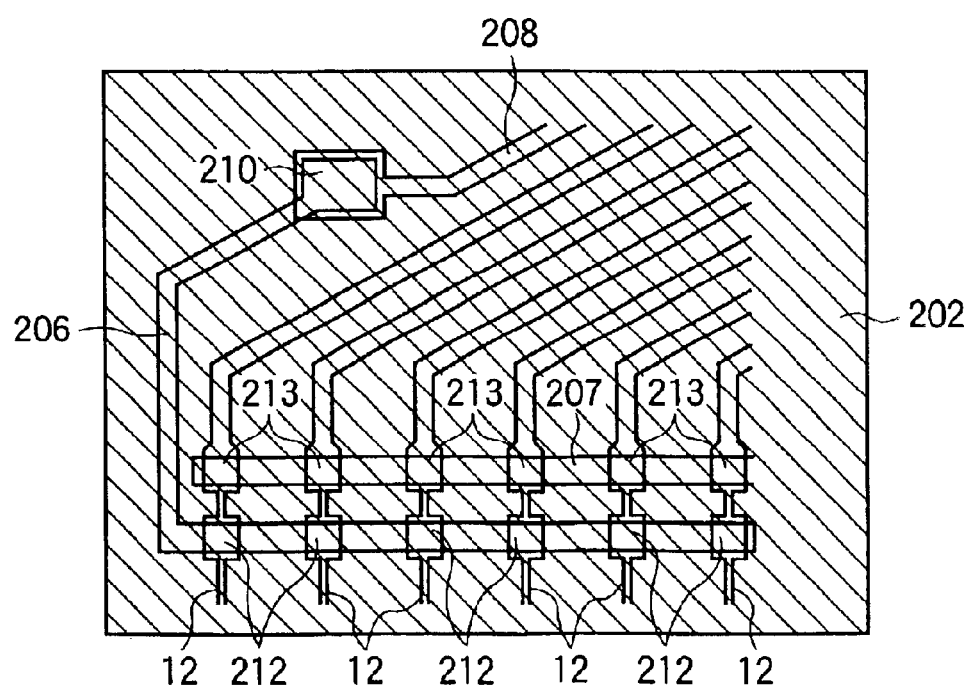
FIG. 4 shows a configuration of the substrate for a liquid crystal display according to the embodiment of the invention.
Figure 5:
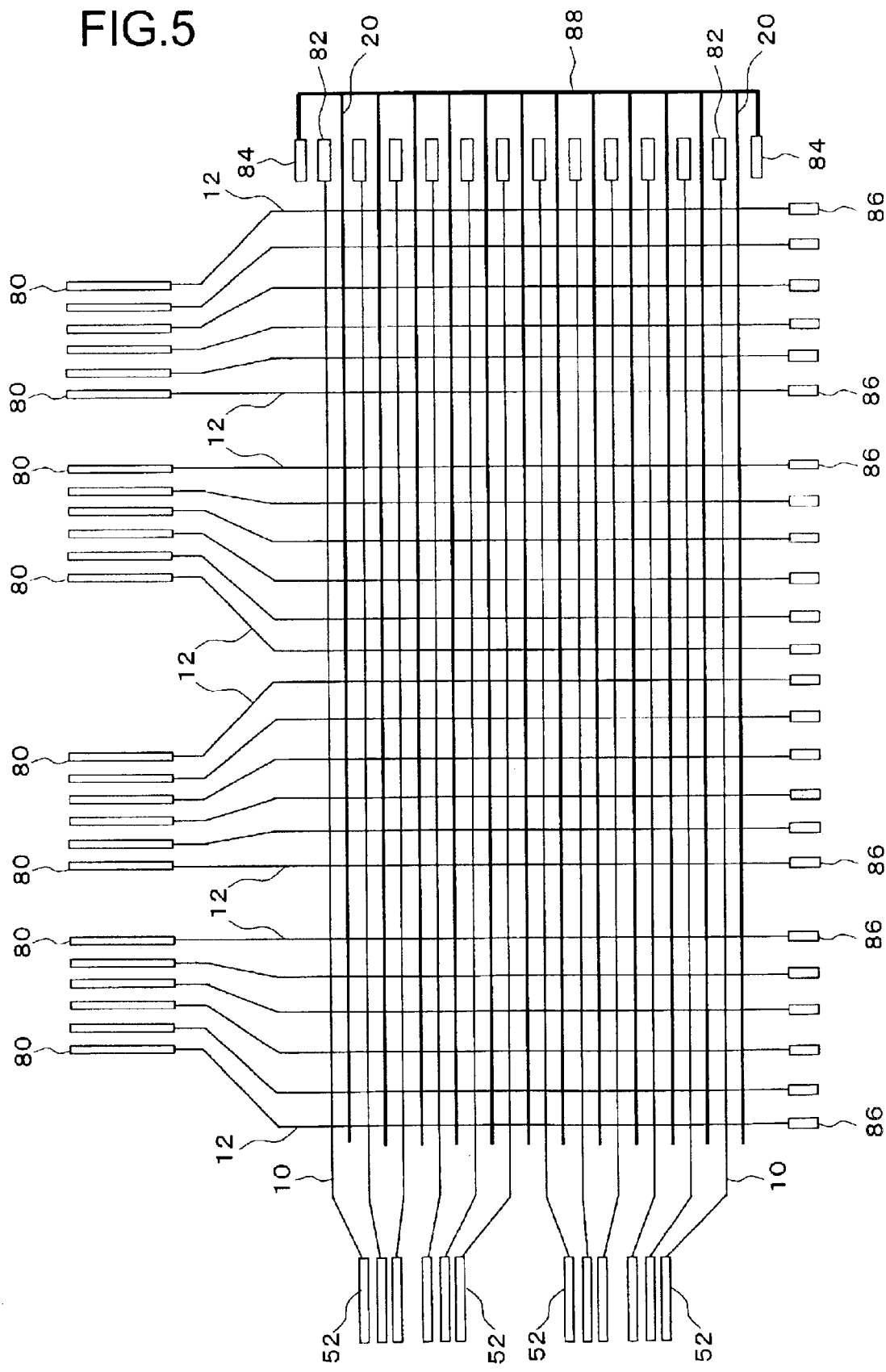
FIG. 5 shows a configuration of the substrate for a liquid crystal display according to the embodiment of the invention.

FIG. 4 is an enlarged view of the region in the circle shown in FIG. 3. As shown in FIG. 4, repair wirings 206, 207 and 208 for repairing breakage of drain bus lines 12 are formed on the frame area 202 such that they avoid the display area 200. The repair wiring 206 intersects a plurality of drain bus lines 12 at each of a plurality of connecting portions 212 with an insulation film interposed therebetween. There pair wiring 207 intersects a plurality of drain bus lines 12 at each of a plurality of connecting portions 213 with the insulation film interposed therebetween. One end of the repair wiring 208 is formed on one end of the repair wiring 206 at a connecting portion 210 thereof with the insulation film interposed therebetween. The connecting portions 210, 212 and 213 are shaded by at least two of the CF resin layers R, G and B formed on the top layer.

Figure 21:
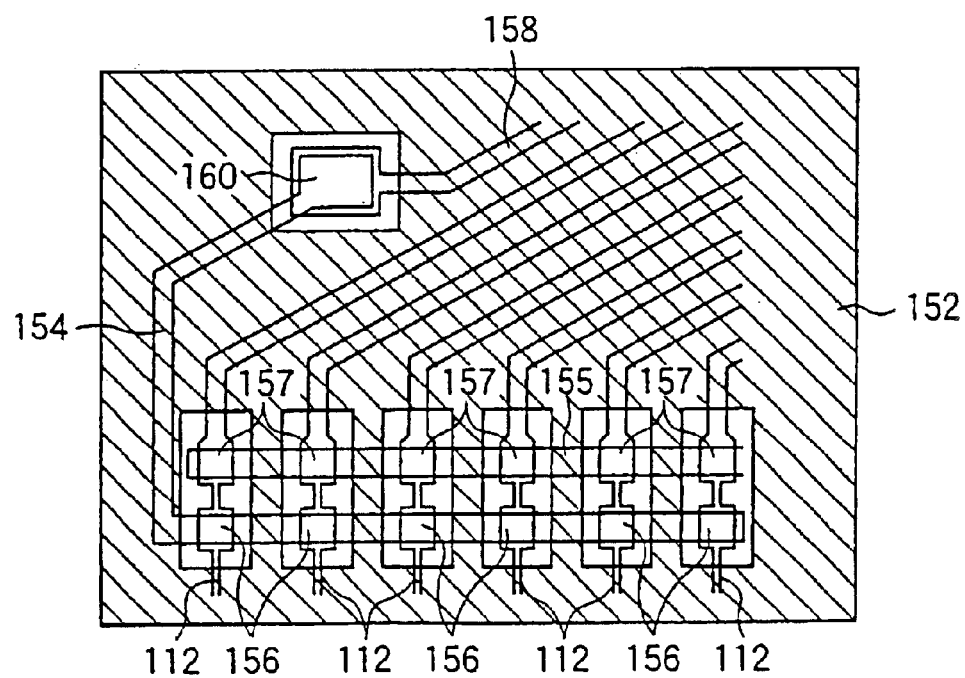
FIG. 21 shows a configuration of the substrate for a liquid crystal display according to the related art.

As thus described, in the present embodiment of the invention, the vicinities of the connecting portions 210, 212 and 213 are shaded by the layered structure having at least two of the CF resin layers R, G and B unlike the connecting portions 156, 157 and 160 according to the related art shown in FIG. 21. Therefore, no leakage of light occurs in the vicinity of the connecting portions 210, 212 and 213. This makes it possible to prevent any reduction in display quality attributable to the leakage of light.

FIG. 5 shows a schematic arrangement of each of the terminals of the substrate for a liquid crystal display of the present embodiment of the invention. As shown in FIG. 5, the gate bus line terminal 52 for each of the plurality of gate bus lines 10 is formed at the left end thereof in the figure. The gate bus line inspection terminals 82 are formed at the right ends of the plurality of gate bus lines 10 in the figure. The drain bus line terminal 80 for each of the plurality of drain bus lines 12 is formed at the upper end thereof in the figure. The drain bus line inspection terminals 86 are formed at the lower ends of the plurality of drain bus lines 12 in the figure.

The plurality of storage capacitor bus lines 20 are connected to a single common storage capacitor wiring 88 at the right ends thereof in the figure. Storage capacitor bus line inspection terminals 84 are formed at both ends of the common storage capacitor wiring 88.

Intervals between each of the bus line inspection terminals 82, 84, and 86 and the arrangement of the same can be determined with relatively high freedom because they are used for an array inspection. Therefore, the same terminal intervals and arrangements may be used in TFT substrates 2 having different panel sizes. This makes it possible to conduct an array inspection on each of the TFT substrates 2 having different panel sizes by using the same probe.

Figure 6:
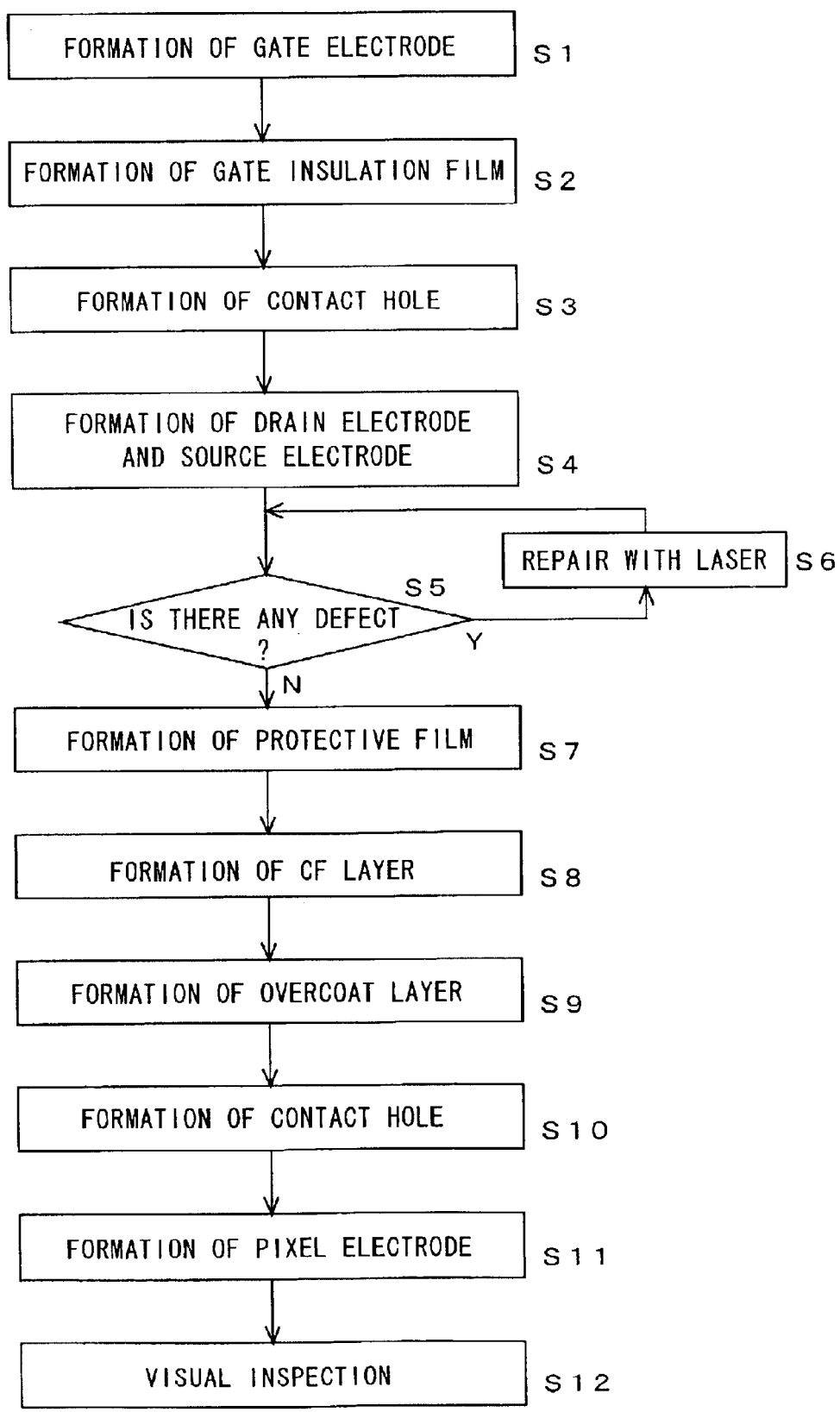
FIG. 6 is a flow chart showing steps for manufacturing the substrate for a liquid crystal display according to the embodiment of the invention.

A description will now be made with reference to FIGS. 6 to 16C on a method of manufacturing the substrate for a liquid crystal display of the present embodiment of the invention. FIG. 6 is a flow chart showing steps for manufacturing the substrate for a liquid crystal display of the present embodiment of the invention. FIGS. 7A to 11C and FIGS. 13A to 16C are sectional views taken at manufacturing steps showing the method of manufacturing the substrate for a liquid crystal display of the present embodiment of the invention. Referring to FIGS. 7A to 11C and FIGS. 13A to 16C, FIGS. 7A, 8A, 9A, 10A, 11A, 13A, 14A, 15A, and 16A show a section of the neighborhood of a TFT 14 taken along the line A—A in FIG. 1, and FIGS. 7B, 8B, 9B, 10B, 11B, 13B, 14B, 15B, and 16B show a section of the neighborhood of a storage capacitor taken along the line B—B in FIG. 1. FIGS. 7C, 8C, 9C, 10C, 11C, 13C, 14C, 15C, and 16C show a section of the neighborhood of a gate bus line inspection terminal 82 taken along the line C—C in FIG. 1. FIG. 12 shows a configuration of the substrate for a liquid crystal display at the step shown in FIGS. 11A, 11B, and 1C.

Figure 7A:
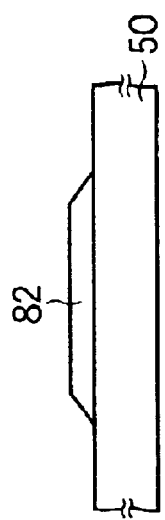
FIGS. 7A to 7C are sectional views taken at a manufacturing step to show steps for manufacturing the substrate for a liquid crystal display according to the embodiment of the invention.
Figure 7B:
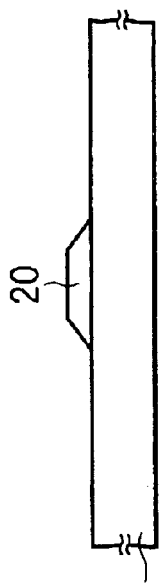
Figure 7C:
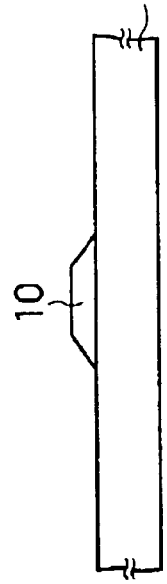

For example, layers of molybdenum nitride (MoN), aluminum (Al), and molybdenum (Mo) are first formed on an entire top surface of a glass substrate 50 in the order mentioned to form a metal layer having a thickness of 150 nm. Next, as shown in FIGS. 7A, 7B, and 7C, the metal layer is patterned to form the gate bus lines (gate electrode) 10 (see FIG. 7A), the storage capacitor bus lines 20 (see FIG. 7B), and the gate bus line inspection terminals 82 (see FIG. 7C) (step Si in FIG. 6). Although not shown, the gate bus line terminals 52 and the storage capacitor bus line inspection terminals 84 are also simultaneously formed at this time.

As shown in FIGS. 8A, 8B and 8C, the insulation film (gate insulation film) 54 constituted of a silicon nitride film (SiN film) having a thickness of 350 nm for example, the amorphous silicon (a-Si) layer 56 having a thickness of 30 nm for example, and the SiN film 58 having a thickness of 150 nm for example are continuously formed on the entire surface of the substrate (step S2 in FIG. 6).

Next, the SiN film 58 is patterned through back exposure using the gate bus lines 10 as a mask to form the channel protection films 60 above the gate bus lines (gate electrode) 10 on an self-alignment basis as shown in FIG. 9A. Next, as shown in FIG. 10C, openings are formed in the a-Si layer 56 on the gate bus line inspection terminals 82 and the storage capacitor bus line inspection terminals 84 (not shown in FIGS. 10A and 10C) to form the contact holes 62 (step S3 in FIG. 6). Although not shown, the contact holes 62 above the gate bus line terminals 52 and the storage capacitor bus line inspection terminals 84 are formed simultaneously at this time. The contact holes 62 are formed using a photolithographic process in the present embodiment of the invention. Obviously, the photolithographic process may be replaced by a step of providing a metal thin plate resistant to etching close to the substrate surface as an etching mask such that only the bus line terminal sections are exposed, and etching the a-Si layer 56 and the insulation film 54 on each of the terminals.

Figures 11A, 11B, 11C:
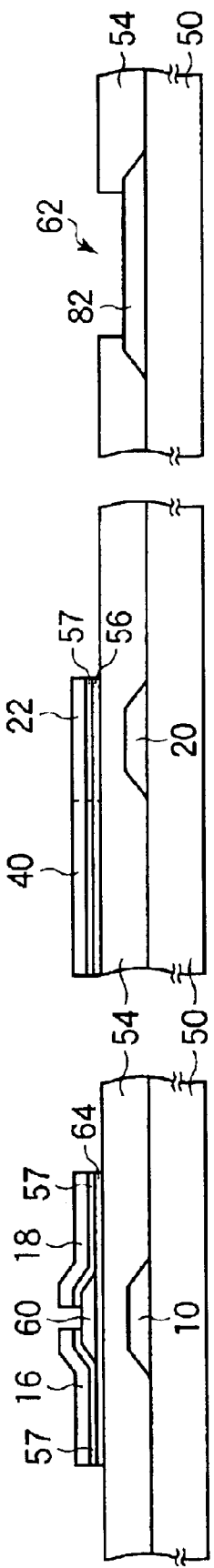
FIGS. 11A to 11C are sectional views taken at a manufacturing step to show steps for manufacturing the substrate for a liquid crystal display according to the embodiment of the invention.
Figure 12:
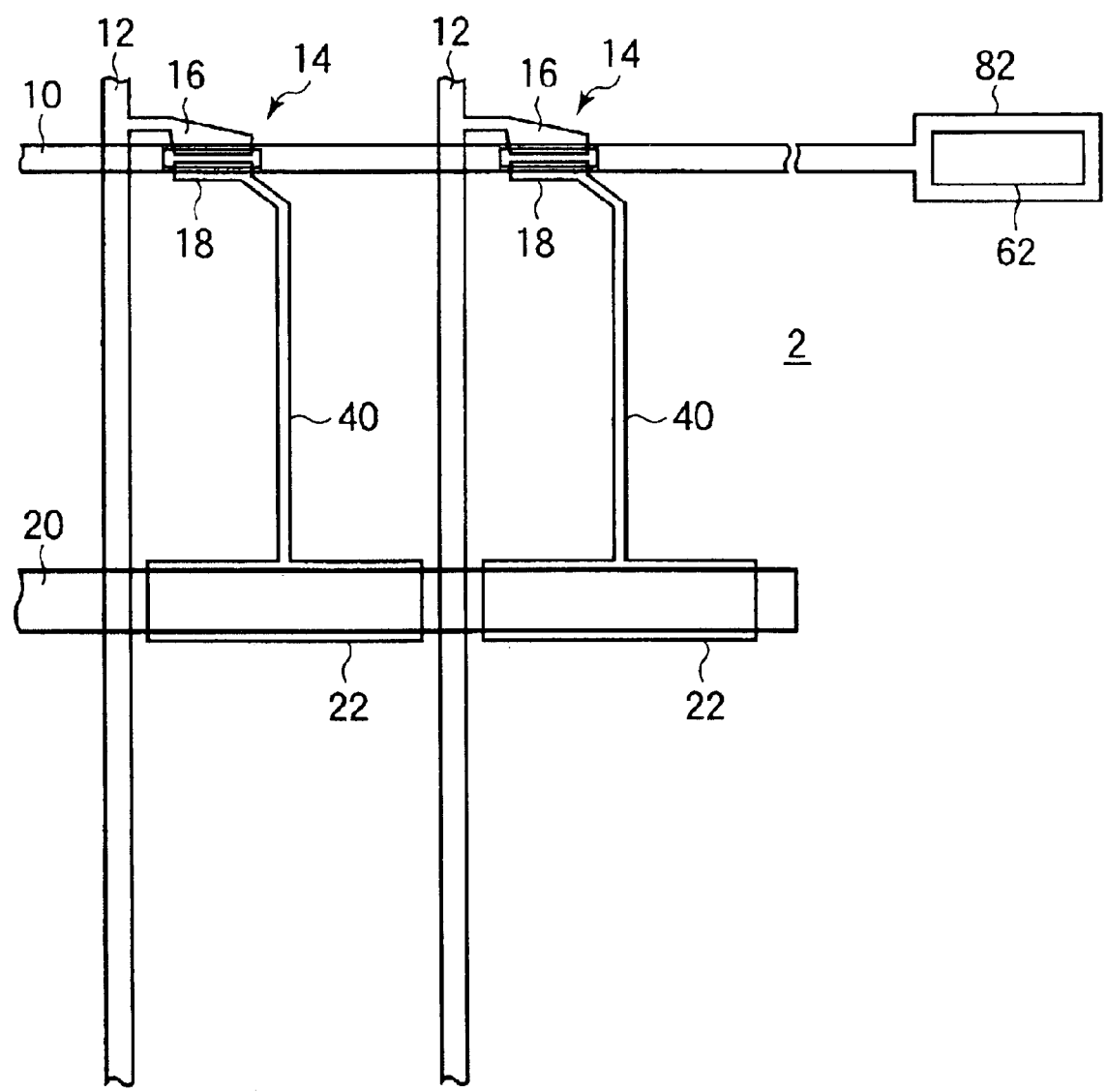
FIG. 12 shows a step for manufacturing the substrate for a liquid crystal display according to the embodiment of the invention.

Next, as shown in FIGS. 11A to 12, the n⁺a-Si layer 57 and the metal layer are formed on the entire surface of the substrate and are patterned to form the active semiconductor layer 64, the drain electrodes 16, the source electrodes 18 (see FIG. 11A), the storage capacitor electrodes 22 (see FIG. 11B), and the connection wirings 40 (see FIGS. 11B and 12) (step S4 in FIG. 6). At this time, the drain bus line terminals 80 and the drain bus line inspection terminals 86 (not shown in FIGS. 11A to 12) are simultaneously formed. As shown in FIG. 12, the source electrodes 18 and the storage capacitor electrodes 22 are electrically connected through the connection wirings 40.

An array inspection is then conducted on the TFT substrate 2 (step S5 in FIG. 6). At the array inspection, for example, a predetermined voltage is applied to the drain bus lines 12 to turn on the TFTs 14 and to charge the storage capacitor at each pixel with a predetermined charge, and the charge stored at each pixel is thereafter measured to detect any defect based on whether the charge exceeds a threshold. When a defect is detected at the array inspection, a visual inspection is conducted using a microscope to detect the exact position of the defect, and predetermined repair is performed on the defect using a laser (step S6 in FIG. 6). According to the method of manufacture of the present embodiment of the invention, a defective position can be easily detected with a microscope because the CF resin layers R, G and B are not formed on the substrate. When inter-layer shorting has occurred between a certain gate bus line 10 and a certain drain bus line 12, the drain bus line 12 is irradiated with a laser beam before and after the region where the inter-layer shorting has occurred to cut the drain bus line 12. The drain bus line 12 and the gate bus line 10 are electrically isolated, and the drain bus line 12 is repaired using the repair wirings 206, 207 and 208. When a drain bus line 12 has been broken, the drain bus line 12 is repaired using the repair wirings 206, 207 and 208. When no defect is detected at the array inspection, the process proceeds to the next step.

Next, as shown in FIGS. 13A, 13B and 13C, a SiN film having a thickness of 100 nm for example is formed on the entire surface of the substrate to form the protective film 66 (step S7 in FIG. 6). Then, any one of the CF resin layers R, G and B is formed at each pixel as shown in FIGS. 14A and 14B (step S8 in FIG. 6). At this time, two CF resin layers, e.g., the layers R and G, are laminated on the TFTs 14 for the purpose of shading light (see FIG. 14A). Since the array inspection has already been finished, two CF resin layers, e.g., the layers R and G are laminated on the gate bus line inspection terminals 82 (see FIG. 14C), the drain bus line inspection terminals 86 and the storage capacitor bus line inspection terminals 84 (both of which are not shown in FIGS. 14A, 14B, and 14C) for the purpose of shading light.

Figure 15A:
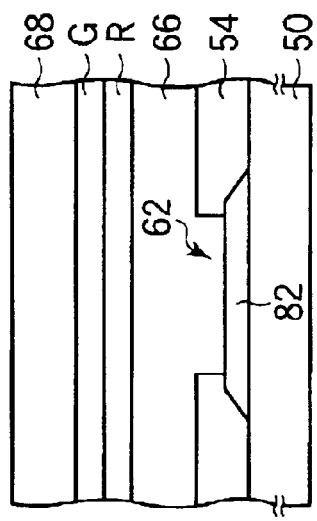
FIGS. 15A to 15C are sectional views taken at a manufacturing step to show steps for manufacturing the substrate for a liquid crystal display according to the embodiment of the invention.
Figure 15B:
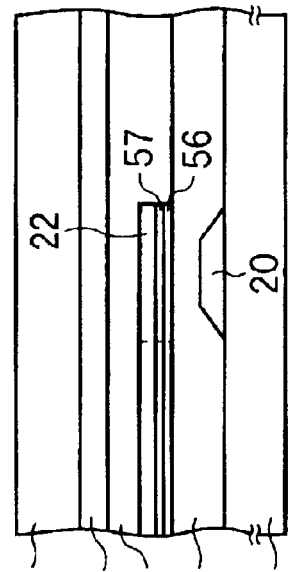
Figure 15C:
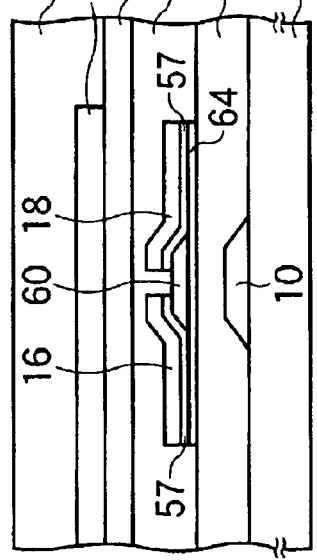
Figure 17:
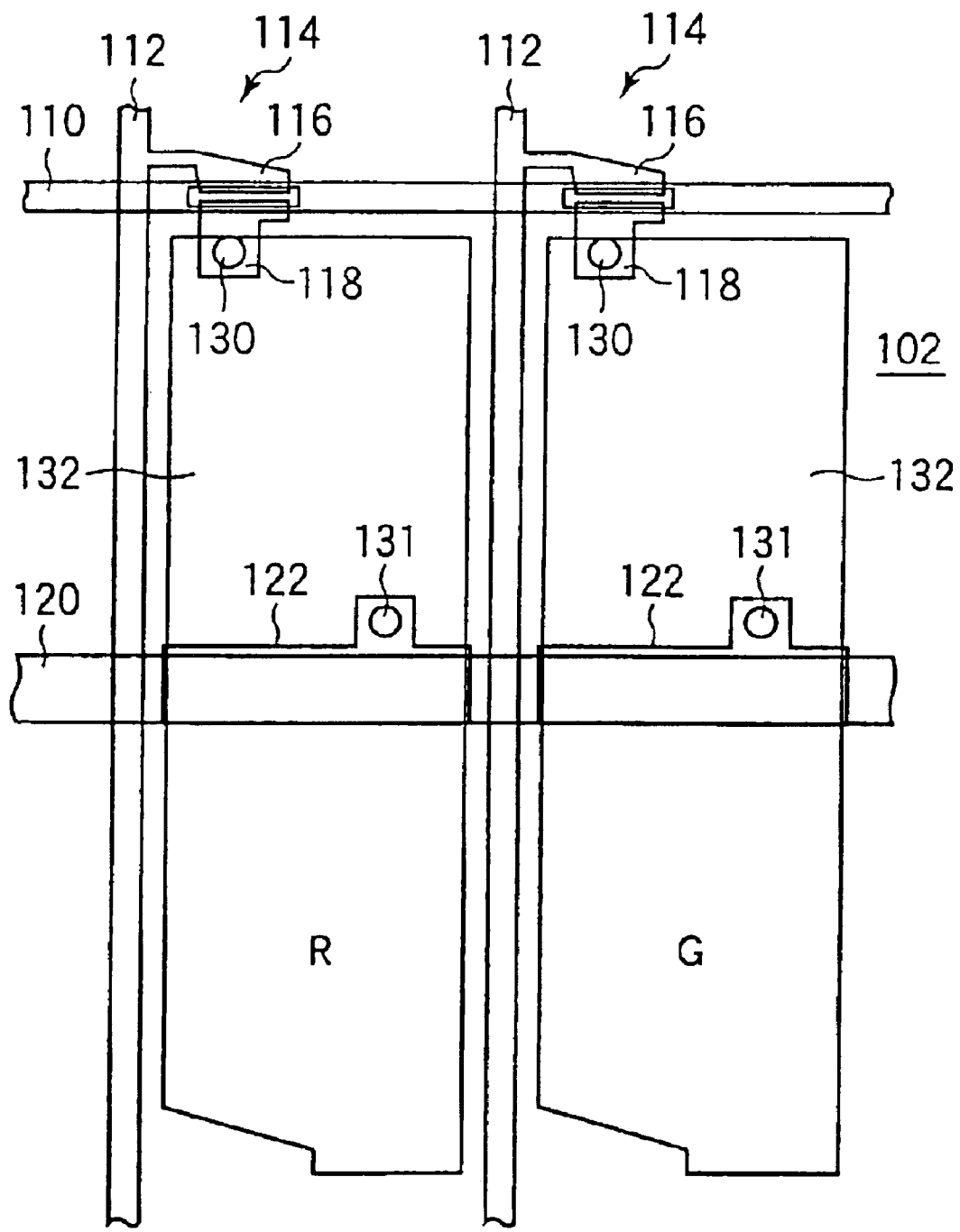
FIG. 17 shows a configuration of a substrate for a liquid crystal display according to the related art.
Figure 18:
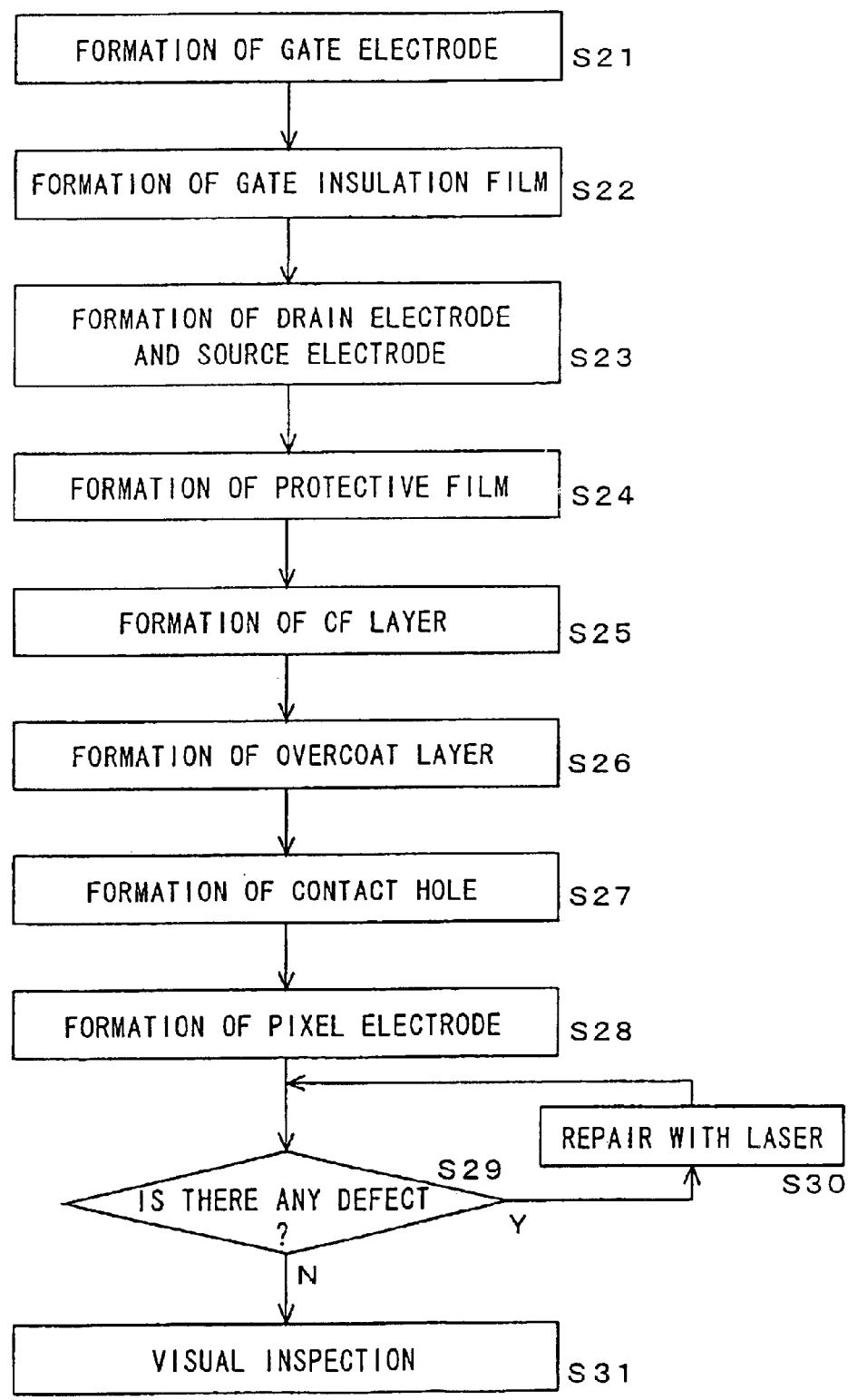
FIG. 18 is a flow chart showing steps for manufacturing the substrate for a liquid crystal display according to the related art.
Figure 19:
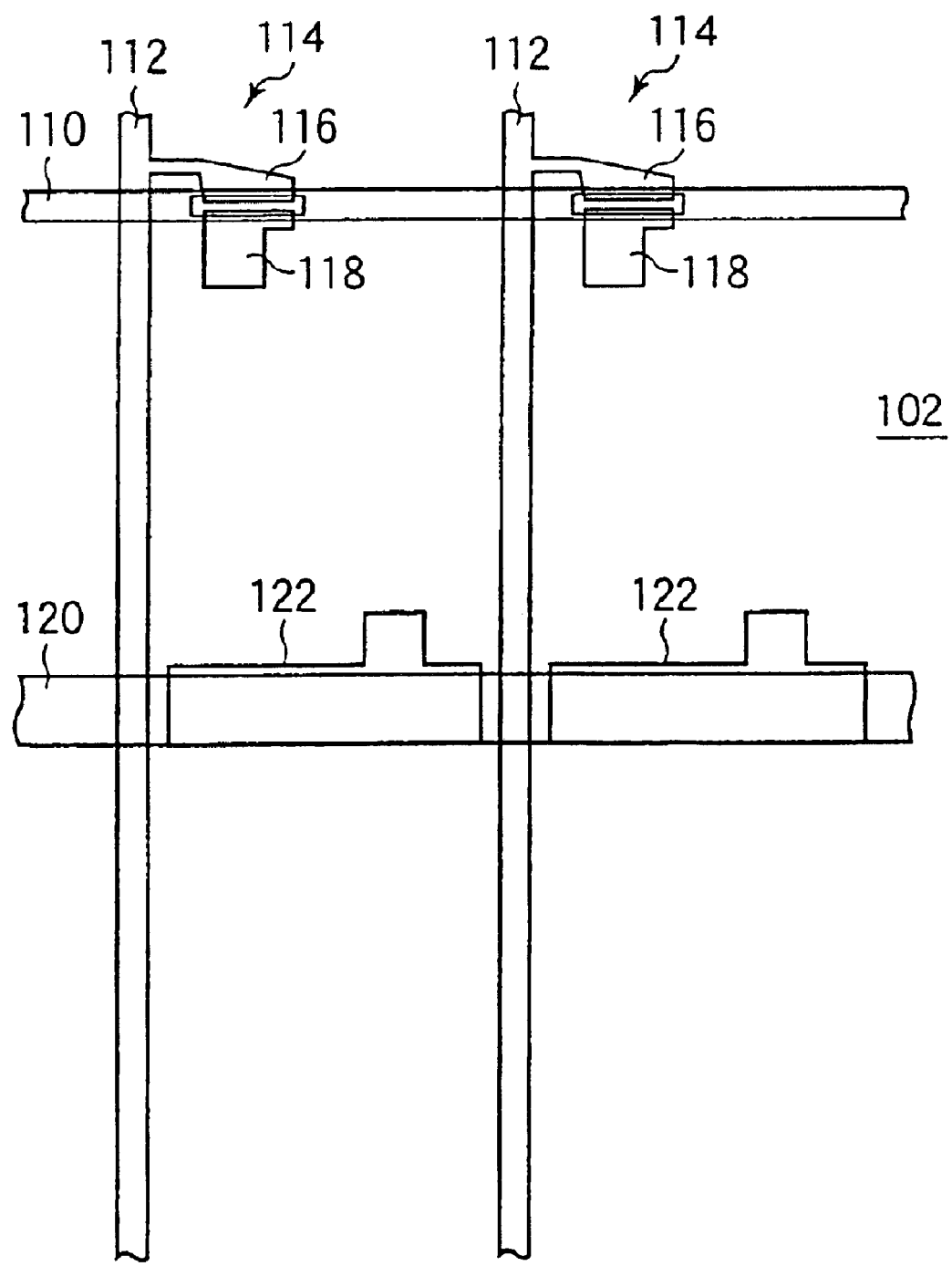
FIG. 19 shows a step for manufacturing the substrate for a liquid crystal display according to the related art.
Figure 20:
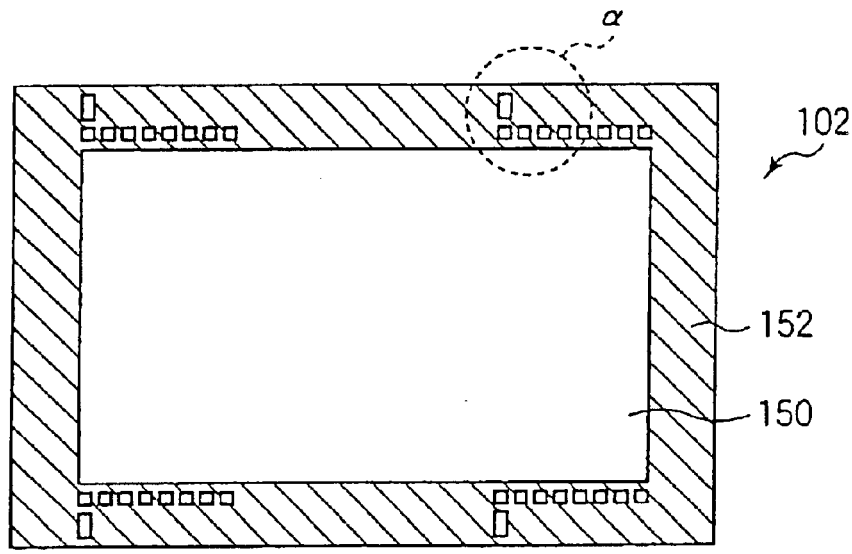
FIG. 20 shows a configuration of the substrate for a liquid crystal display according to the related art.

Next, as shown in FIGS. 15A, 15B, and 15C, the overcoat layer 68 having a thickness in the range from 3 to 4 μm is formed on the entire surface of the CF resin layers R, G and B (step S9 in FIG. 6). Then, as shown in FIG. 16B, openings are formed in the overcoat layer 68, the CF resin layers R, and the protective film 66 above the storage capacitor electrodes 22 to form the contact holes 31 (step S10 in FIG. 6). Although not shown, contact holes are simultaneously formed above the gate bus line terminals 52 and the drain bus line terminals 80 at this time. For example, an ITO film is then formed on the entire surface and is patterned to form the pixel electrodes 32 (step S11 in FIG. 6). Then, a visual inspection such as a pattern inspection is conducted (step S12 in FIG. 6). Any pattern defect of the pixel electrodes 32 is discovered at the visual inspection. The substrate for a liquid crystal display as shown in FIGS. 2A, 2B and 2C is completed through-the above-described steps.

Thereafter, the substrate is combined with an opposite substrate, and a liquid crystal composition that is a mixture of a liquid crystal material and a monomer is injected. The liquid crystal molecules are irradiated with ultraviolet rays with the molecules tilted by applying a predetermined voltage between the substrates to polymerize the monomer. This completes a liquid crystal display which employs alignment regulation according to the polymer fixing method.

In the present embodiment, since the array inspection is conducted after the source electrodes 18 and the drain electrodes 16 are formed and before the protective film 66 is formed, the metal layer is exposed at the bus line inspection terminals 82, 84 and 86 which are contacted by a probe pin during the array inspection. This can result in scratches on the surface of the bus line inspection terminals 82, 84 and 86 attributable to the contact with the probe pin, and protrusions (hillocks) can be formed because of the scratches. However, layers having a relatively great thickness such as the CF resin layers R, G and B and the overcoat layer 68 are formed on the bus line inspection terminals 82, 84 and 86 at steps that follow the array inspection. Therefore no shorting occurs between the bus line inspection terminals 82, 84 and 86 and the common electrode on the opposite substrate.

In the present embodiment, since the CF resin layers R, G and B are formed after the array inspection is conducted, the connecting portions 210, 212 and 213 can be shaded from above. Since there is no leakage of light in the vicinity of the connecting portions 210, 212 and 213, display quality can be improved.

In the present embodiment, since none of the CF resin layers R, G and B has been formed on the gate bus lines 10, the drain bus lines 12 and the storage capacitor bus lines 20 at the time of the array inspection, it is easy to detect the position of a defect at the visual inspection.

Further, the connection wirings 40 of the present embodiment are formed such that they overlap the trunk sections 91 in parallel with the drain bus lines 12 when viewed in a direction perpendicular to the substrate surface, although they are formed in the pixel regions. This makes it possible to provide a liquid crystal display capable of presenting bright display without reducing the substantial aperture ratio.

A description will now be made on a modification of the substrate for a liquid crystal display of the present embodiment and a method of manufacturing the same. Although not shown, in a region located in a frame area 202 of a TFT substrate 2, there is formed an inner-short-ring for preventing electrostatic discharge damage which remains after the product is completed. Outside the frame area 202, there is formed an outer-short-ring for preventing electrostatic discharge damage which is cut and discarded at a subsequent step. Both of the short-rings are connected to bus lines 10, 12 and 16 through TFTs for preventing electrostatic discharge damage which are not shown. This prevents any shift of a threshold of TFTs and inter-layer shorting that otherwise occurs when the bus lines 10, 12 and 16 are charged with static electricity.

A gate electrode and a drain electrode of a TFT for preventing electrostatic discharge damage are electrically connected to the same bus line 10, 12 or 16 or the same short-ring such that it is turned on when the respective bus line 10, 12, or 16 is charged with static electricity having a high potential.

In the present modification, a highly accurate photolithographic method utilizing a stepper is used as a method of exposing the a-Si layer 56 and the insulation film 54 in patterning shown in FIGS. 10A, 10B and 10C. Since this makes it possible to achieve high patterning accuracy, a contact hole can be formed in the insulation layer 54 to electrically connect the gate electrode and the drain electrode of the TFT for preventing electrostatic discharge damage to the same bus line 10, 12 or 16 or the same short-ring. Therefore the gate metal layer and the drain metal layer can be connected without the intervention of an ITO layer.

In the present modification, the TFTs for preventing electrostatic discharge damage are therefore completed when the drain bus lines 12 are formed, which makes it possible to provide a TFT substrate 2 having excellent anti-electrostatic-discharge-damage properties. At least two of CF resin layers R, G and B may be formed by stacking each other above the contact holes formed in the insulation film 54 to shade the same regions from above. Since this prevents light from leaking from the contact holes in the vicinity of the TFTs for preventing electrostatic discharge damage although the inner-short-ring remains in the frame area 202, excellent display quality can be achieved.

A description will now be made on a modification of the method of detecting a defect on a substrate for a liquid crystal display according to the present embodiment. In the present modification, an infrared microscope that detects and visualizes the intensity of infrared rays is used instead of an ordinary microscope at a visual inspection conducted after a defect is detected on a TFT substrate 2 having CF resin layers R, G and B formed thereon at an array inspection.

Since infrared rays are transmitted by resin layers such as the CF resin layers R, G and B and the overcoat layer 68, the use of an infrared microscope at the visual inspection makes it possible to detect a defect in a region where two of the CF resin layers R, G or B are formed by stacking each other.

As described above, the invention makes it possible to provide a substrate for a liquid crystal display on which the position of a defect can be easily detected to provide high display quality, a liquid crystal display having the same, and a method of manufacturing the same.

What is claimed is:

1. A substrate for a liquid crystal display comprising:
    a base substrate that sandwiches a liquid crystal in combination with an opposite substrate provided opposite thereto;
    a plurality of bus lines formed on the base substrate such that they intersect each other with an insulation film interposed therebetween;
    pixel regions provided in the form of a matrix on the base substrate;
    a thin film transistor formed at each of the pixel regions;
    a storage capacitor electrode formed at each of the pixel regions;
    a connection wiring which is formed of the same material as that of a source electrode of the thin film transistor and the storage capacitor electrode and which electrically connects the source electrode and the storage capacitor electrode;
    color filter layers formed at the pixel regions; and
    a pixel electrode formed at each of the pixel regions on the color filter layers,
    wherein the pixel electrode has a stripe-like electrode having a trunk section extending in parallel with or perpendicularly to the bus lines and a plurality of branch sections branching from the trunk section and extending at an angle to the bus lines and spaces in the stripe-like electrode and wherein the connection wiring is formed in an overlapping relationship with the stripe-like electrode when viewed in a direction perpendicular to the substrate surface.

2. A substrate for a liquid crystal display according to claim 1, wherein the connection wiring is formed in an overlapping relationship with the trunk section when viewed in a direction perpendicular to the substrate surface.

3. A substrate for a liquid crystal display according to claim 1, further comprising a short-ring formed around the base substrate and a thin film transistor for preventing electrostatic discharge damage that connects the short-ring and the plurality of bus lines, wherein a gate electrode and a drain electrode of the thin film transistor for preventing electrostatic discharge damage are electrically connected through a contact hole formed in a gate insulation film.

4. A liquid crystal display having a pair of substrates and a liquid crystal sealed between the pair of substrates, wherein a substrate for a liquid crystal display according to claim 1 is used as one of the substrates.

5. A substrate for a liquid crystal display comprising:

a base substrate that sandwiches a liquid crystal in combination with an opposite substrate provided opposite thereto;

a plurality of bus lines formed on the base substrate such that they intersect each other with an insulation film interposed therebetween;

pixel regions provided in the form of a matrix on the base substrate;

a thin film transistor formed at each of the pixel regions;

a storage capacitor electrode formed at each of the pixel regions;

a connection wiring which is formed of the same material as that of a source electrode of the thin film transistor and the storage capacitor electrode and which electrically connects the source electrode and the storage capacitor electrode;

color filter layers formed at the pixel regions;

a pixel electrode formed at each of the pixel regions on the color filter layers, and repair wirings formed for repairing the bus lines and intersecting portions where the bus lines and the repair wirings intersect with an insulation film interposed therebetween, wherein at least two of the color filter layers are formed by laminating each other on the intersecting portions.

6. A substrate for a liquid crystal display according to claim 5, further comprising a short-ring formed around the base substrate and a thin film transistor for preventing electrostatic discharge damage that connects the short-ring and the plurality of bus lines, wherein a gate electrode and a drain electrode of the thin film transistor for preventing electrostatic discharge damage are electrically connected through a contact hole formed in a gate insulation film.

7. A liquid crystal display having a pair of substrates and a liquid crystal sealed between the pair of substrates, wherein a substrate for a liquid crystal display according to claim 5 is used as one of the substrates.

* * * * *